United States Patent [19]

Adkins

[11] Patent Number: 4,596,370
[45] Date of Patent: Jun. 24, 1986

[54] CONTAINER HOLDER

[76] Inventor: George H. Adkins, 4511 Dickey Dr., La Mesa, Calif. 92041

[21] Appl. No.: 693,931

[22] Filed: Jan. 22, 1985

[51] Int. Cl.⁴ .............................................. A47K 1/08
[52] U.S. Cl. ............................ 248/311.2; 224/30 A; 224/41
[58] Field of Search ............... 248/311.2, 214, 314, 248/309.1, 230, 346.1; 220/DIG. 12, 85 H; 229/1.5 H, 1.5 R; 224/30 A, 41, 36; D7/45

[56] References Cited

U.S. PATENT DOCUMENTS

| | | | |
|---|---|---|---|
| 1,280,030 | 9/1918 | Hill | 224/41 X |
| 3,285,455 | 11/1966 | Pewitt | 248/311.2 UX |
| 3,463,436 | 8/1969 | Foster | D7/45 X |
| 3,633,863 | 1/1972 | Abbey | 248/346.1 |
| 3,698,675 | 10/1972 | Lerew | 248/311.2 |
| 3,847,324 | 11/1974 | Uchanski | 229/1.5 H |
| 4,009,810 | 3/1977 | Shook | 248/311.2 X |
| 4,040,549 | 8/1977 | Sadler | 248/311.2 X |
| 4,071,175 | 1/1978 | Wagnon | 248/311.2 X |
| 4,088,250 | 5/1978 | Schaefer | 220/85 H X |
| 4,127,211 | 11/1978 | Zerbey | 220/85 H X |
| 4,256,281 | 3/1981 | Harris et al. | 224/30 A X |
| 4,293,015 | 10/1981 | McGough | D7/45 X |
| 4,312,465 | 1/1982 | Sinkhorn | 220/85 H X |
| 4,345,704 | 8/1982 | Boughton | 220/85 H X |
| 4,508,303 | 4/1985 | Beckerer | 248/311.2 |
| 4,540,611 | 9/1985 | Henderson | 220/85 H X |

FOREIGN PATENT DOCUMENTS

| | | | |
|---|---|---|---|
| 521480 | 7/1921 | France | 224/36 |
| 1096759 | 6/1955 | France | 224/36 |

Primary Examiner—J. Franklin Foss
Attorney, Agent, or Firm—Frank D. Gilliam

[57] ABSTRACT

A container holder for clamping to a tubular support member. The container holder comprises a base member for supporting on its upper surface a tubular container open at its upper end. The lower surface of the base member includes an adjustable clamp for adjustably gripping different sized tubular supports. The container holder is either formed of rigid or flexible insulating material. When rigid, the container holder, base and adjustable clamp are formed as an integral unit. When formed of flexible insulating material, the container holder can be fixedly attached to the upper surface of the base member or removably attached by means of Velcro ® hook and eye fastening material. The clamping means may be located on the rigid container intermediate its ends.

13 Claims, 5 Drawing Figures

CONTAINER HOLDER

BACKGROUND OF THE INVENTION

This invention relates to containers or carriers, and is more particularly concerned with an open carrier for containers that can be clamped to tubular members of various sizes.

Numerous and varied carriers for canned or bottled goods, and various and sundry supporting expedients have been proposed heretofore, particularly for the carrying of containers.

By way of example, U.S. Pat. No. 591,390 is referred to as showing a gimbaled flower holder for bicycles which is attached to the handle bars. U.S. Pat. No. 4,345,704 teaches a bottle mount and bottle for a bicycle for attachment to vertically inclined frame members and employs Velcro ® attachment means between the bottle mount and bottle whereby the bottle is selectively removable from the mount. There are also a number of different container holders and bottle combinations wherein the holders are constructed of formed wire in the nature of a cage for removably securing the container therein when clamped to a vertically inclined bicycle frame member.

With the exception of the flower carrier taught by U.S. Pat. No. 591,390, the available container holders taught by the prior art mentioned above position the holder and the container supported thereby at a relative inaccessible location which requires the rider of the bicycle in congested traffic or along unsure paths taking one's eyes from the transversing path of travel to remove and/or replace a container of liquid is a safety hazard.

There has not been a convenient container holder which is easily accessible to the operator of a bicycle or the like until the emergence of the instant invention.

SUMMARY OF THE INVENTION

The container holder, according to the president of the invention, includes a base member which supports a tubular container holder on its upper surface and a clamp member on its lower surface with a substantially tubular opening therethrough which is adjustable to grip a plurality of different sized horizontal tubular members.

In the first embodiment, the base member, tubular container holder and clamp are formed as an integral unit of thermo plastic material, as for example, polypropylene or the like. A bolt passes through the clamp, which has an open end wall and by adjustment of a wing nut or the bolt the clamp can be adjusted as to cross-sectional size of the tubular opening of the clamp which mates with a tubular support. The center line of the tubular opening in the clamp and the center line of the container are positioned perpendicular to each other so that the container will be in an upright use position when mounted on a substantially horizontal tubular member, such as, for example, a bicycle handlebar. An insulation sleeve is generally positioned within the tubular container holder and the container is inserted into the insulation sleeve. The insulation sleeve is generally formed from soft plastic foam material, such as for example, styrofoam or the like. The insulation sleeve serves at least two purposes, helps to maintain the temperature of the liquid in the container and helps to prevent the transfer of shock between the tubular support and the liquid container.

In a second embodiment of the container holder the clamp member is located on the side of the tubular container holder for mounting on a substantially vertical tubular support.

In a third embodiment of the container holder, the base and clamps are substantially identical to the first embodiment, except the tubular container holder is constructed of flexible material similar to or the same as wet suit material used by swimmers, surfers, divers or the like in cold water. Velcro ® hook and eye fastening material is attached to the upper surface of the base and the closed bottom of the flexible tubular container holder so that they can be selectively connected or separated. In this embodiment, the flexible tubular member additionally functions as the insulation sleeve of the first and second embodiments. The flexible tubular member is formed as to size so as to grasp the container which it holds.

An object of the invention is to provide a new and improved insulating carrier for containers and a means for their attachment to a tubular support.

Another object of the invention is to provide a new and improved insulating carrier for containers holding hot or cold contents and kept the contents at their desired temperature for an extended length of time.

Still another object of the invention is to provide a new and improved insulating carrier which can be mounted on various diameter horizontal tubular support members.

Still another object of the invention is to provide an improved insulated container carrier which can be removed from its support base for portability.

A still further object of the invention is to provide a container carrier that can be attached to horizontal or vertical tubular support members.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

DETAILED DESCRIPTION OF THE DRAWINGS

Figure 1:
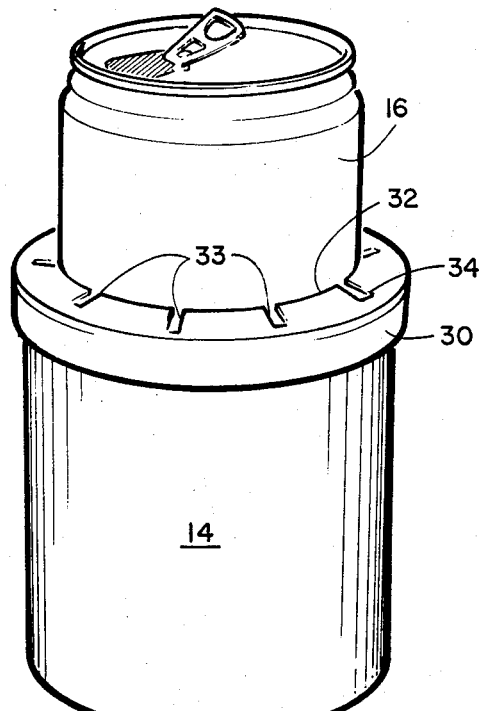
FIG. 1 is an exploded perspective showing of a first embodiment of the invention.
Figure 2:
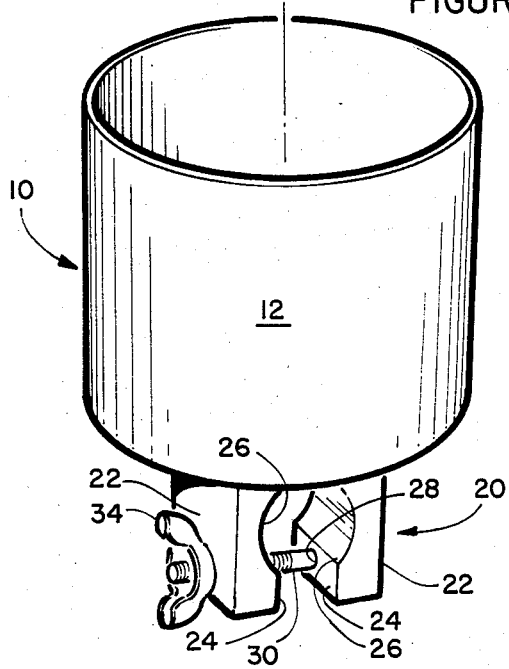
FIG. 2 is a bottom view of the showing of FIG. 1.
Figure 2:
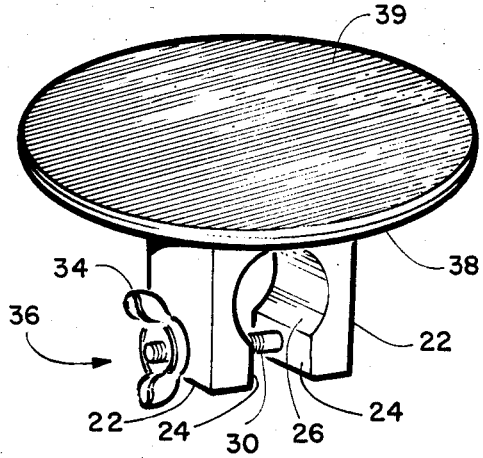
Figure 2:
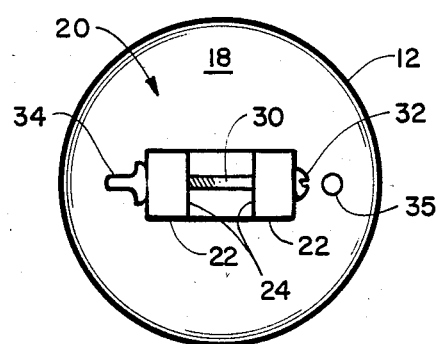

On reference to FIGS. 1 and 2, a container carrier 10 comprises an open tubular receptacle 12 adapted to receive an insulation sleeve 14 in which a beverage container 16 can be inserted. Positioned on the bottom outer surface 18 of tubular receptacle 12 is a clamp member 20. The clamp member 20 comprises two downward extending arms 22 fixedly attached to the bottom outer surface 18. The inward directed surfaces 24 have a concave surface 26. At the outer or distal ends of extending arms 22 have aligned apertures 28 (one shown) which receive bolt 30 therethrough. One end of the bolt 30 has a head 32 and the opposite end is threaded to receive a wing nut 34. Obviously, the tightening of the nut 34 on the bolt held in place by head 32 moves the outer or distal ends of the extending arms reducing the size of the aperture formed by the opposing concave surfaces 26. In this manner, the clamp can be adjusted to grip various different sized support members.

The tubular receptacle 12 can be formed of various different types of semi-rigid materials, for example, metal, plastics or the like. The plastic material referred to as polypropylene is found to be a suitable material.

The insulation sleeve 14 is generally formed of a soft material which acts as a good temperature insulator. Various materials are suitable for this purpose, by way of example and not by way of limitation, material such as plastic or rubber foams may be used. Polyurethane foam has been found to be satisfactory. On the open end of the insulation sleeve, its bottom not shown being closed, is a cap or lid 30 which contains a plurality of slits or cuts 33. The slits or cuts are to allow some degree of flexibility to the size of the opening 32 whereby various diameter containers 16 can be inserted through the opening 32 and held firmly in place by the gripping of the inner surface thereof. An aperture 35 through the bottom surface 18 allows for liquid drainage.

Figure 3:
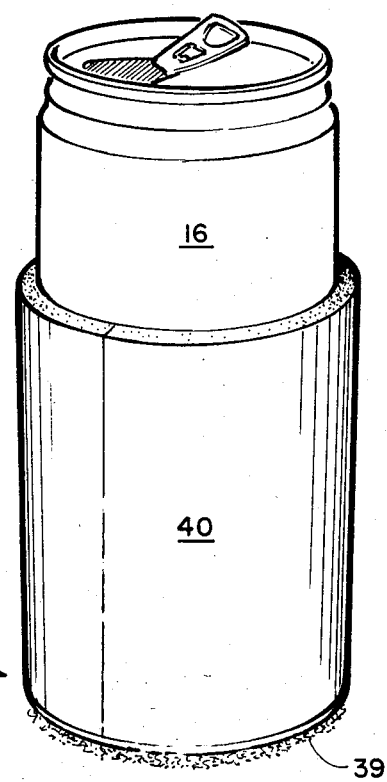
FIG. 3 is an exploded perspective showing of a second embodiment of the invention.

Referring now to FIG. 3 wherein a similar container carrier 37 is shown. Container support 38 comprises a flat upper surfaced base member 36 which includes the same clamp 20 as shown in FIGS. 1 and 2 and described above. The upper surface of the support 38 has Velcro ® hook or eye type material 39 fixedly adhered thereto. A soft insulating sleeve member 40 for holding the container has Velcro ® hook or eye material (opposite that type positioned on the surface 38) on its bottom surface for mating with the Velcro ® material on the upper surface of the support 38. The Velcro ® material 39 when engaged allows a removable attachment of the sleeve member 40 to the upper surface of container support 38 of the base member 36.

The base member 36 is constructed from the same or similar material as is the tubular receptacle 12 of FIGS. 1 and 2. The sleeve member 40 is constructed of soft rubber type foam material or the like which is commonly used to make swim clothes for use by swimmers or the like in cold water, commonly referred to as "wet suits." The sleeve member, however, may be constructed of a more rigid material, such as that material used to construct insulation sleeve 14 of FIG. 1.

Figure 4:
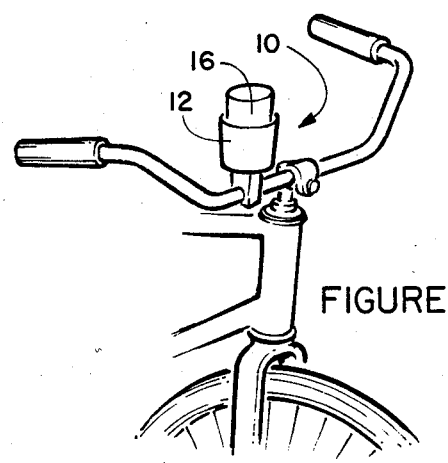
FIG. 4 shows the invention attached to the horizontal portion of a bicycle handlebar.

FIG. 4 depicts the container carrier of the first embodiment attached to a horizontal portion of a bicycle handlebar. It should be understood that the second embodiment of the invention can be attached in a like manner.

Figure 5:
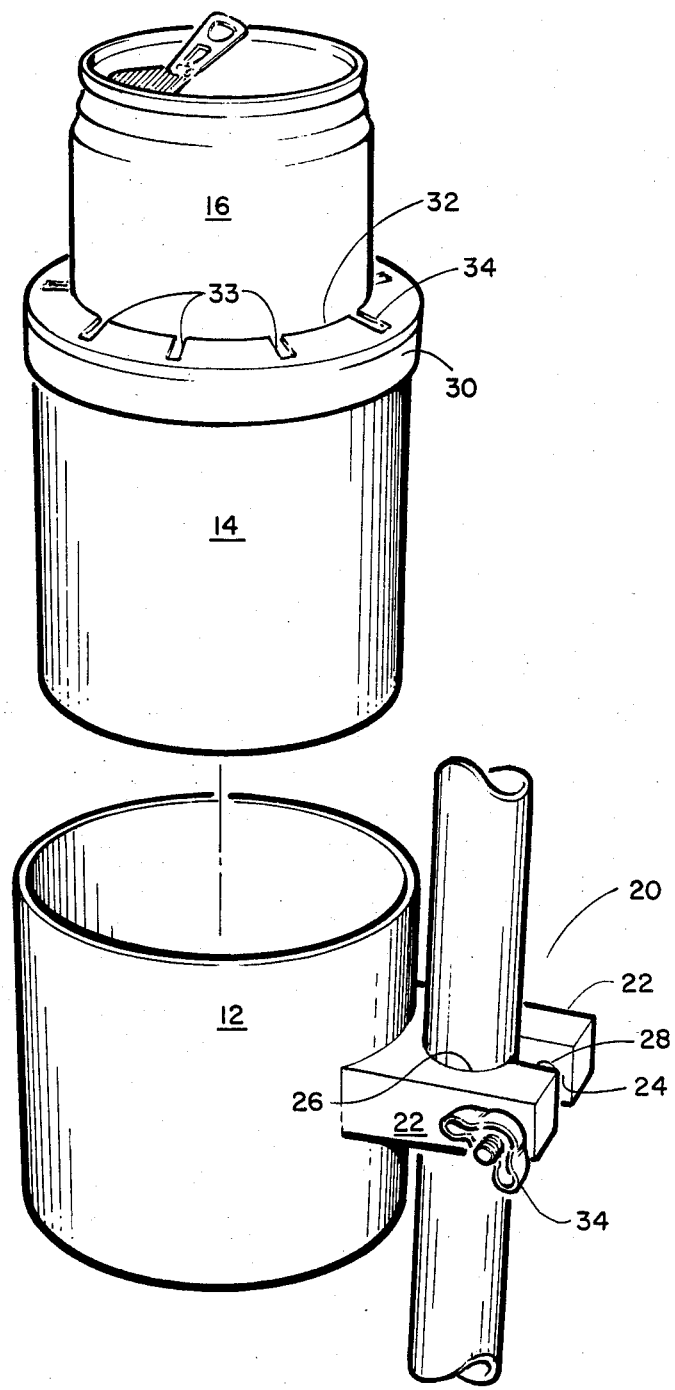
FIG. 5 is a third embodiment of the invention suitable for attachment to a vertical directed tubular support member.

FIG. 5 is a showing of the embodiment as shown in FIGS. 1 and 2 except the clamp 20 is positioned on the side of the open tubular receptacle 12 rather than on the bottom surface 18 thereof. This allows the container carrier to be attached to a vertical directed tubular mount.

In the embodiment of FIGS. 1 and 5 the open tubular container and clamp member 20 may be formed as an integral unit, that is, cast or vacuum formed or attached one to the other by adhesive means.

It should be understood that variations and modifications may be effected without departing from the spirit and scope of the novel concepts of the invention.

I claim:

1. A holder for a beverage container comprising:
a base member having a flat upper surface;
an upstanding open tubular member attached to said flat base member, said flat base member forming a bottom surface for said upstanding tubular member;
a pair of juxtaposed members extending from said flat base member on the end opposite the open end of said open tubular member, said juxtaposed members having rectilinear outer surfaces and curvilinear inner surfaces, said curvilinear inner surfaces form a substantially tubular open walled bore, said bore being aligned perpendicular to the opening of said tubular member and open between the distal end of said juxtaposed members; and
adjacent means associated with said substantially tubular bore so as to conform in a gripping manner with various different sized tubular support members.

2. The invention as defined in claim 1 wherein said base member is circular to conform with the diameter of said open tubular member.

3. The invention as defined in claim 1 wherein said flat base member, said open tubular member and said juxtaposed members are formed as an integral unit.

4. The invention as defined in claim 3 wherein said integral unit is formed from thermo plastic material.

5. The invention as defined in claim 1 wherein said adjustment means comprises a threaded bolt and wing nut combination, said bolt is captured and extends across the distal end opening between the juxtaposed members, said wing nut when threaded on said bolt adjusts the crosssectional area of said substantially tubular bore.

6. The invention as defined in claim 1 wherein said open tubular member includes a bottom member having a lower surface and said attachment means is positioned between said bottom member lower surface and the upper surface of said base member, said attachment is selectively detachable.

7. The invention as defined in claim 6 wherein said attachment means comprises Velcro ® hook and eye attachment means.

8. The invention as defined in claim 1 additionally comprising a removable thermal insulating sleeve the outer surface of which conforms to the interior surface of the open tubular member, said thermal insulating sleeve is open to receive a liquid container.

9. The invention as defined in claim 8 wherein the open surface of said sleeve includes a serrated ring formed of resilient material for gripping and sealingly engaging a plurality of different sized beverage containers.

10. The invention as defined in claim 1 additionally comprising a thermal insulation sleeve the outer surfaces of which conform to the interior surface of said open tubular member, said thermal insulation sleeve is open to receive a beverage container.

11. The invention as defined in claim 10 wherein the open surface of said sleeve includes a serrated ring formed of resilient material for gripping and sealingly engaging a plurality of different sized beverage containers.

12. The invention as defined in claim 6 wherein said open tubular member is formed of resilient material the interior of which is adaptable to conform to a the shape of plurality of different sized containers.

13. The invention as defined in claim 12 wherein said resilient material is a thermal insulating material.

* * * * *